(12) United States Patent
Smith et al.

(10) Patent No.: US 8,728,419 B1
(45) Date of Patent: May 20, 2014

(54) PROCESS FOR RECYCLING ALKALINE BATTERIES

(71) Applicant: Toxco, Inc., Anaheim, CA (US)

(72) Inventors: W. Novis Smith, Philadelphia, PA (US); Michael Arutunian, Havertown, PA (US); Scott Swoffer, New Castle, DE (US)

(73) Assignee: Retriev Technologies Incorporated, Anaheim, CA (US)

( * ) Notice: Subject to any disclaimer, the term of this patent is extended or adjusted under 35 U.S.C. 154(b) by 0 days.

(21) Appl. No.: 13/757,252

(22) Filed: Feb. 1, 2013

Related U.S. Application Data

(63) Continuation-in-part of application No. 13/373,604, filed on Nov. 21, 2011.

(51) Int. Cl.
*C01G 45/00* (2006.01)

(52) U.S. Cl.
USPC ............................. 423/50; 426/605; 429/49

(58) Field of Classification Search
USPC .............................................. 423/50; 429/49
See application file for complete search history.

(56) References Cited

U.S. PATENT DOCUMENTS

| 4,401,463 A | 8/1983 | Melin et al. |
| 5,352,270 A | 10/1994 | Shackle |
| 2008/0317650 A1* | 12/2008 | Boren et al. .................. 423/50 |

\* cited by examiner

*Primary Examiner* — Steven Bos
(74) *Attorney, Agent, or Firm* — RatnerPrestia

(57) ABSTRACT

The invention relates to the recovery of manganese dioxide, zinc hydroxide/oxide and steel from metal cased alkaline dry cell batteries which have been wet crushed. There is also a process for recovery of the steel and high purity manganese dioxide which can be directly utilized in the electrode for alkaline dry cell batteries.

9 Claims, No Drawings

PROCESS FOR RECYCLING ALKALINE BATTERIES

RELATED APPLICATION

This is a continuation-in-part of application Ser. No. 13/373,604 of Smith et al filed Nov. 21, 2011.

FIELD OF THE INVENTION

The present invention relates to an improved process for the recovery of zinc compounds, high purity manganese compounds and steel from waste metal cased alkaline batteries. Accordingly, the batteries are initially crushed with water and the casing particles and electrode components separated. Zinc compounds in the electrolyte are then separated from manganese compounds by chemical separation steps and recovered.

BACKGROUND OF THE INVENTION

About 85% of all batteries used commercially are alkaline batteries (dry cell batteries). These are currently essentially all land filled because current potential recycling processes for these batteries have high energy cost, capital costs, and processing costs which do not allow for sufficient economic incentive for the recovery of the valuable components of these batteries. Steel cased batteries contain about 26-65% steel, 4-10% alkaline electrolyte with 20-35% of mixed manganese oxides, 20-35% zinc hydroxide/oxide and some carbon. The size of the battery or ratio of casing to components determines the relative amount of steel casing to the zinc and manganese content. If these batteries are to be economically viable to be recycled, the zinc oxide/zinc compounds and the manganese oxides contained therein would have to be readily and efficiently isolated separately in high purity (>95%) and yield to maximize their value. In addition, the steel casings would also need to be isolated free of these other components for efficient recycle as scrap steel for steel production. There have been a number of processes described for processing and recycling these batteries. These processes range from pyro metallurgical ones in which the metal and manganese are recovered in an alloy and the zinc is partially recovered as impure in flue dust and requires much further processing by hydrometallurgical steps which require the total solution of the zinc and extensive chemical separation steps. There are some processes which attempt selective solution of the zinc and in the presence of considerable amount of the steel casing which in a mixed solution of manganese, steel and zinc now have to be separated with high purity requiring many processing steps and high energy.

The prior art has been unable to obtain high purity manganese dioxide at low-cost from the manganese oxides contained in these batteries. Consequently, the reuse of recovered manganese oxide has been with impurities. The use of impure $MnO_2$ prepared from these batteries gives lower efficiency when used in new batteries.

SUMMARY OF THE INVENTION

The present invention provides a process for the recycling of metal cased alkaline batteries and the like to separate the casing metal components from the zinc and manganese compounds which form an aqueous slurry along with other battery and electrolyte components.

Accordingly, the process comprises the steps of:
1) Wet washing crushed or hammer-milled alkaline batteries;
2) Screening the particles of step 1) to retain the coarse casing particles and recovering the slurry containing other battery and electrolyte components;
3) Dewatering the slurry from step 2);
4) Acid extracting the solids from step 3) with an acid selected from the group consisting of sulfuric acid, nitric acid or a mixture thereof to extract the zinc and the soluble manganese compounds;
5) Filtering the product of step 4) and adjusting the pH of the filtrate to 3-5;
6) Treating the filtrate of step 5) with an oxidizing agent to convert any soluble manganese (II) to insoluble $MnO_2$ and any iron to ferric oxide or hydroxide;
7) Filtering the resulting product of step 6) to recover $MnO_2$;
8) Treating the filtrate from step 7) with an alkali carbonate or soda ash to pH 10-11 to form zinc carbonate. Alternatively, treatment with an alkali hydroxide to produce zinc hydroxide;
9) Optionally, the $MnO_2$ of step 6) can be reduced to manganese (II) and the pH adjusted to pH 10-11 to precipitate and recover manganese hydroxide. This is preferably performed under an inert atmosphere. The $MnO_2$ is preferably recovered for reuse because of its high purity.

It is a general object of the invention to recycle steel cased alkaline batteries to recover manganese oxide, zinc and steel.

It is a further object of the invention to recover steel from steel cased alkaline batteries which is ready for smelting into new steel sheets.

It is a still further object of the invention to recover a high purity $MnO_2$ and zinc oxide.

It is understood that the battery casting may comprise any of the different steel including carbon steel, cobalt steel and the like.

DESCRIPTION OF THE PREFERRED EMBODIMENTS

According to the invention there is the recovery of high purity manganese oxides, carbonates or hydroxides, zinc carbonate and casing metals (steel) from waste alkaline batteries. The process comprises the steps of:
1) Wet crushing or hammer milling alkaline or related batteries with an aqueous stream to form a slurry containing coarse steel particles and a slurry comprising manganese zinc and the other compound particles;
2) Screening the coarse metal casing particles from step 1) and recovering the slurry; Optionally using a magnet to remove iron particles;
3) Filtering the slurry from step 2).
4) Acid extracting the solids from step 3) with a solution of 20%-40% by weight sulfuric acid to extract all of the zinc and soluble reduced manganese (II) and zinc from zinc manganate;
5) Filtering the product of step 4) and recovering the manganese oxide cake;
6) Adjusting the pH of the filtrate from step 5) to a pH of 4-5 with an alkali, hydroxide, or with soda ash; Optionally the solution is heated and stirred for about 3 hours and then filtered to remove any ferric oxide/hydroxide formed as a result of oxidation;
7) Treating the filtrate from step 6) with an oxidizing agent such as alkali persulfate, air, ammonium persulfate, hydrogen peroxide and the like to oxidize the soluble manganese sulfate to gamma $MnO_2$;

8) Filtering the product from step 7) and treating the filtrate with an alkali carbonate or soda ash to pH 10-11 to precipitate zinc carbonate, alternatively, the filtrate can be treated with an alkali hydroxide to produce zinc hydroxide;

9) Reacting the filter cake from the product of step 5) which comprises insoluble $MnO_2$ and carbon with sodium meta bisulfate or sulfur dioxide at pH≤3 to reduce the insoluble manganese oxides to soluble manganese (II) sulfate. The solution is filtered to remove any carbon. The pH of the solution is then adjusted to pH 4 and an oxidizing agent is added to form gamma $MnO_2$. Optionally, the pH is adjusted to pH 10-11 with an alkali hydroxide to precipitate any manganese hydroxide (II).

More specifically, the process consisted of wet crushing the alkaline batteries and screening such as by a shaker table through −¼" screen or slotted grid to retain the steel separately from the fine electrode particles in the slurry which are −140 mesh. These fine particles in the slurry consist of the manganese oxides, conductive carbon, zinc oxide, and unreacted zinc metal powder. The slurry is filtered and 20% by weight sulfuric acid solution is added to the filter cake with enough water to have about a 20% slurry. This slurry is stirred and heated to extract all of the zinc compounds including zinc manganite and the soluble reduced manganese oxides (II). The solubilized manganese is about 5-15% of the manganese present. The slurry is filtered and washed to produce a manganese oxide cake with about 10% carbon present. The filtrate contained all of the zinc sulfate and some manganese sulfate.

The filtrate containing the valuable zinc is adjusted to pH 4-5 with sodium hydroxide. The solution is heated and stirred for three hours and then filtered to remove the small amount of ferric hydroxide/oxide which has formed by air oxidation. Then 5-10% by weight of an oxidizing agent, preferably sodium persulfate or hydrogen peroxide is added to the filtrate and the solution stirred 3 hours to oxidize the soluble manganese (II) sulfate to gamma manganese dioxide which precipitates. This slurry is filtered and the clear zinc sulfate solution is then treated with an alkali carbonate, ammonium carbonate or soda ash to pH 10-11 to precipitate zinc carbonate. This slurry is filtered to produce a purified grade of zinc carbonate. Sodium hydroxide could be used to produce zinc hydroxide instead. The manganese oxide precipitate is gamma $MnO_2$ which is about 10% of the manganese and can be sold directly or it can be combined back into the initial extracted insoluble manganese oxide cake still containing the carbon.

The insoluble manganese oxide cake with the carbon is reacted with sodium meta bisulfate or sulfur dioxide at pH≤3 to reduce the insoluble manganese oxides to manganese (II) which is soluble in an acid solution as manganous sulfate (II). This solution is filtered which removes the carbon. The filtered solution is adjusted to pH 4-5, preferably 4, and reacted with sodium persulfate to form gamma $MnO_2$. Optionally, the pH of this solution is adjusted to pH 10-11 to precipitate manganous hydroxide (II) which is pale pink and air sensitive. This preferably is performed under inert atmosphere. This manganous hydroxide can be furnaced to produce the green MnO. This carbon which is recovered can also be recycled for complete recovery of all battery components.

High purity gamma manganese dioxide ($MnO_2$) is desirable for use in alkaline batteries, when alkaline batteries are recycled. The recoverable materials most desired are the steel from the casing and gamma $MnO_2$ and the purified insoluble $MnO_2$ cake.

A preferred process for the recovery of $MnO_2$ after the wet crushing of the alkaline batteries and the recovery of the coarse steel pieces comprises the steps of:

1) Filtering the slurry resulting after magnetically removing any iron particles;
2) Treating the filter cake from step 1) with a solution of sulfuric acid, preferably about 15-25% by weight of sulfuric acid;
3) Filtering the product of step 2) and adjusting the pH to pH 3-5;
4) Oxidizing the product of step 3) to precipitate any iron as ferric hydroxide;
5) Filtering the product of step 4) and treating the filtrate with a solution of sodium persulfate to precipitate gamma $MnO_2$ and then;
6) Recovering the gamma $MnO_2$.

Preferably in step 3) sodium hydroxide is used to adjust the pH. In step 4) the product can be air oxidized.

The following examples further illustrate the practice of the invention but are not intended to be limiting thereof:

EXAMPLE 1

A. Recovery of Steel

A mixture of 1.5 kg alkaline battery dry cells (predominantly AA cells) was run through a hammer mill with a minimum of water spray. The slurry was screened through a 25 mesh grating and screen to give a +25 mesh fraction which consisted of clean steel metal chips from the battery cell casings and suitable for direct steel metal recovery and recycling. This amounted to about 600 g (40% of the total dry cell battery weight) as recovered steel. Further screening of the slurry through −140 mesh left another 300 g (20% of the steel which was −140 mesh) for a total of about 900 g (about 60% of the dry cell battery weight) as clean steel chip and powder ready for direct steel furnace recycling.

B. Recovery of $MnO_2$

The −140 mesh slurry of part A containing all of the zinc and manganese compounds (32% of the AA battery; 480 g solids) was passed over a magnet and then filtered leaving the damp wet cake ready for acid extraction. Sufficient 20% sulfuric acid solution was added until this slurry had a consistent pH 1. The acidic slurry was heated to 60-80° C. with stirring to dissolve the $Mn(II)O_2$ and all of the zinc. The slurry was then filtered and washed to yield a filter cake containing 390 g of $MnO_2$. The filtrate containing about 10% of Mn(II) sulfate and all of the zinc is zinc sulfate. It was adjusted to pH 4 with sodium hydroxide. This solution was heated and air oxidized to remove any iron present as ferric hydroxide was filtered off. To this filtrate was added 2 liters of water and 100 g sodium persulfate and the slurry stirred heated over 80° C. for two hours and filtered to remove gamma $MnO_2$. The filter cake was washed thoroughly to remove any soluble zinc compounds. The XRD analysis on this material showed that it had been oxidized and it was substantially gamma manganese dioxide having more value than the mixed manganese oxides.

The purified filtrate (pH 4) contained all of the zinc as zinc sulfate with all of the manganese and iron removed. Sodium carbonate was added to the filtrate to pH10-11 to precipitate pure zinc carbonate.

EXAMPLE 2

Recovery of Zinc

To 1.00 kg of the −140 mesh damp filter cake obtained after treatment of alkaline batteries according to the process of Example 1, Part A, was added to 400 ml of water and then 260 g of concentrated $H_2SO_4$ (26% by weight of damp cake) was carefully added with stirring and the slurry was maintained at 65° C. for 1.5 hours.

After cooling, the slurry was filtered and washed until a pH of 3 was reached.

The filtrate was still at pH 1, so it was adjusted to pH 4 with a sodium carbonate ($Na_2CO_3$) solution.

The weight of acid washed insoluble manganese oxides (10-15% carbon included) was 500 g. This cake can be used for direct feed into a reductive furnacing process for producing manganous oxide (MnO) which is a starting point for electrolytic processes.

The filtrate at pH 4 was treated with 40 g of sodium persulfate and heated to boiling for 3 hours with stirring to air oxidize any soluble iron and divalent manganese present. This slurry of the $MnO_2$ and any iron present was filtered to give a purified solution of zinc sulfate.

A 25 wt % solution of $Na_2CO_3$ was slowly added to the new filtrate containing only zinc sulfate at this point in order to precipitate zinc carbonate. Sodium carbonate solution was added until a pH of 10-11 was reached in the slurry. The zinc carbonate formed was filtered and washed. The amount of zinc carbonate that was isolated weighed 209 g. This pure zinc carbonate can be used as the zinc source for making the electrolyte for electrowinning zinc metal. Instead of adding sodium carbonate, soda ash or sodium hydroxide can be added to precipitate zinc hydroxide instead.

EXAMPLE 3

Isolation of Gamma Manganese Dioxide

The insoluble manganese oxide cake (500 g) from Example 2 was slurried in 300 ml of water and then 100 g of concentrated sulfuric acid was added to adjust the pH to about 1. 500 g of sodium meta bisulfite was then added as a 30% solution in water over one hour with stirring and cooling to maintain the temperature at 18-20° C. The slurry was stirred an additional hour and then heated to 60° C. for 30 minutes. The pH was maintained at 1 with sulfuric acid. The hot solution was then filtered to remove the conductive carbon present from the initial battery fabrication to give a concentrated pink solution of pure manganous sulfate. Sulfur dioxide can be used in place of sodium meta bisulfite. This solution was then poured into a second reaction flask and stirred while the pH was adjusted to 2 with sodium carbonate carefully to avoid excessive foaming. Then 50% sodium hydroxide was carefully added to adjust the pH to 4. This solution was stirred and 300 g of sodium persulfate was added over a one hour period while maintaining the pH at 4 with sodium hydroxide. The solution was then heated and maintained at 90-100° C. for one hour. The slurry was then filtered and washed to produce 490 g of gamma manganese dioxide. This recovered manganese dioxide is suitable for direct use in alkaline batteries as the cathode material.

EXAMPLE 4

Alkaline AA cells were wet crushed in a hammer mill and the aqueous slurry was screened through −140 mesh. 1000 g of the damp cake (500 g dry weight) were reslurried in 400 ml water and a magnet was applied to remove any iron metal powder present. Then 200 g of concentrated sulfuric acid was added and this resulting slurry was stirred for 2 hours at 70° C. This slurry was then filtered and washed until the filtrate was pH 5. The dried cake of insoluble manganese oxides (including $MnO_2$, $Mn_2O_3$, and $Mn_3O_4$) containing 10-15% conductive carbon weighed 387.8 g. The initial filtrate from the acid extraction was adjusted to pH 4 with sodium hydroxide. Then 200 g of sodium persulfate in 600 g of water was added. The solution was boiled for 3 hours while the dark insoluble $MnO_2$ precipitated. This slurry was filtered and the filtrate consisted of a pure solution of zinc sulfate. The $MnO_2$ precipitate weighed 50.5 g dry.

About 1.5 kg of 25% sodium carbonate solution was added to the stirred zinc sulfate filtrate until pH 11 to precipitate zinc carbonate. This slurry was filtered and the white zinc carbonate isolated. The zinc carbonate weighed 416 g after drying and contained 50 ppm Mn and 50 ppm Fe.

What is claimed is:

1. A process for recovering high purity manganese dioxide from a slurry wherein alkaline batteries have been wet crushed and the casing particles have been removed which comprises the steps of;
   1) filtering said slurry to obtain a filter cake;
   2) treating the filter cake from step 1) with a solution of sulfuric acid to obtain a first product;
   3) filtering the first product from step 2) to obtain a cake of insoluble manganese oxides and a filtrate and adjusting the pH of the filtrate to pH 3-5;
   4) oxidizing the filtrate from step 3) to obtain a second product;
   5) filtering the second product from step 4) to obtain a filtrate and treating the filtrate with a solution of sodium persulfate to precipitate manganese dioxide; and then
   6) recovering the manganese dioxide.

2. The process of claim 1 which comprises adjusting the pH of the filtrate from step 3) with sodium hydroxide.

3. The process of claim 1 which comprises using air oxidation in step 4) at a pH of about 4 and at an elevated temperature.

4. The process of claim 1 which comprises treating the filter cake in step 2) with a 15 to 25% by weight solution of sulfuric acid.

5. The process of claim 1 comprising treating the filtrate of step 5) with an alkali hydroxide.

6. The process of claim 1 which comprises adjusting the pH of the filtrate of step 3) to pH 4-5 with sodium hydroxide and then adding sodium persulfate to form $MnO_2$.

7. The process of claim 1 which comprises dewatering the filter cake from step 1) prior to treatment with a sulfuric acid solution.

8. The process of claim 1 wherein step 2) includes heating the slurry after the treatment with said sulfuric acid solution at an elevated temperature.

9. The process of claim 8 wherein said elevated temperature is 80° C.

\* \* \* \* \*